(12) United States Patent
Stanton

(10) Patent No.: US 9,014,211 B2
(45) Date of Patent: Apr. 21, 2015

(54) REDUCING THE MAXIMUM LATENCY OF RESERVED STREAMS

(71) Applicant: Intel Corporation, Santa Clara, CA (US)

(72) Inventor: Kevin B. Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/254,540

(22) Filed: Apr. 16, 2014

(65) Prior Publication Data

US 2014/0226660 A1     Aug. 14, 2014

Related U.S. Application Data

(63) Continuation of application No. 12/910,427, filed on Oct. 22, 2010, now Pat. No. 8,761,201.

(51) Int. Cl.
*H04L 12/26* (2006.01)
*H04L 12/18* (2006.01)
*H04L 12/46* (2006.01)
*H04L 12/911* (2013.01)
*H04L 12/927* (2013.01)
*H04L 12/913* (2013.01)

(52) U.S. Cl.
CPC ........ *H04L 12/1881* (2013.01); *H04L 12/4625* (2013.01); *H04L 47/72* (2013.01); *H04L 47/805* (2013.01); *H04L 47/822* (2013.01); *H04L 47/724* (2013.01); *H04L 47/781* (2013.01)

(58) Field of Classification Search
USPC ......................................................... 370/468
See application file for complete search history.

(56) References Cited

U.S. PATENT DOCUMENTS 5,701,465 A     12/1997     Baugher et al.
2002/0093983 A1     7/2002     Newberg et al.
(Continued)

FOREIGN PATENT DOCUMENTS

JP     2002-118576 A     4/2002
WO     2006/040744 A1     4/2006
(Continued)

OTHER PUBLICATIONS

IEEE, "Virtual Bridged Local Area Networks, Amendment 12: Forwarding and Queuing Enhancements for Time-Sensitive Streams", IEEE Standard for Local and metropolitan area networks, IEEE Std 802.1Qav™-2009 (Amendment to IEEE Std 802.1Q™-2005), Jan. 5, 2010, 87 pages.

(Continued)

*Primary Examiner* — Melvin Marcelo
(74) *Attorney, Agent, or Firm* — Christopher K. Gagne

(57) ABSTRACT

An embodiment may include circuitry that may facilitate, at least in part, assignment, at least in part, of at least one bandwidth reservation for at least one packet stream and/or at least one stream reservation class. The at least one bandwidth reservation may be greater than an expected communication bandwidth of the at least one packet stream. The assignment of the at least one bandwidth reservation may be made prior to commencement of communication of the at least one packet stream. The at least one bandwidth reservation may be assigned exclusively to the at least one packet stream and/or the at least one stream reservation class. Many modifications, variations, and alternatives are possible without departing from this embodiment.

15 Claims, 2 Drawing Sheets

(56) References Cited

U.S. PATENT DOCUMENTS

| | | |
|---|---|---|
| 2008/0235699 A1 | 9/2008 | Jeong et al. |
| 2008/0288638 A1 | 11/2008 | Diab et al. |
| 2008/0298241 A1 | 12/2008 | Ohana et al. |
| 2009/0049175 A1 | 2/2009 | Finn |

FOREIGN PATENT DOCUMENTS

| | | |
|---|---|---|
| WO | 2012/054389 A2 | 4/2012 |
| WO | 2012/054389 A3 | 6/2012 |

OTHER PUBLICATIONS

IEEE P802.1Qat/D6.0, "Virtual Bridged Local Area Networks—Amendment XX: Stream Reservation Protocol (SRP)", Draft Standard for Local and Metropolitan Area Networks, Apr. 23, 2010, 108 pages.
Goetz, Franz Josef, "AVB for Industrial Communication Networks part 1—requirements for low latency streams", IEEE 802.1 Interim Meeting, Geneva, May 26, 2010, pp. 1-12.
Kleineberg, Oliver, "AVB for low latency networks: part 2—requirements for media redundancy", Hirschmann Automation & Control, IEEE 802.1 Interim Meeting, Geneva, May 2010, 7 pages.
"Calculating the Delay Added by Qav Stream Queue", Aug. 26, 2009, 4 pages. web link available at: http://www.ieee802.org/1/files/public/docs2009/av-fuller-queue-delay-calculation-0809-v02.pdf.
Pannell, Don, "AVB Latency Math", 802.1 AVB Face to Face—Dallas, TX, v5, Nov. 2010, pp. 1-43.
Pannell, Don, "AVB—Generation 2, Latency Improvement Options", 802.1 AVB Face to Face—Singapore, v1, Mar. 2011, pp. 1-46.
Extended European Search Report received for European Patent Application No. 11834931.5, mailed on Feb. 17, 2014, 5 pages.
Supplementary European Search Report received for European Patent Application No. 11834931.5, mailed on Mar. 6, 2014, 1 page.
International Search Report and Written Opinion received for PCT Patent Application No. PCT/US2011/056544, mailed on Apr. 18, 2012, 8 pages.
International Preliminary Report on Patentability and Written Opinion received for PCT Patent Application No. PCT/US2011/056544, mailed on May 2, 2013, 5 pages.
Notice of Allowance received for Japanese Patent Application No. 2013-534063, mailed on Apr. 1, 2014, 3 pages of Notice of Allowance only.
Office Action received for U.S. Appl. No. 12/910,427, mailed on Aug. 15, 2013, 15 pages.
Response to Office Action received for U.S. Appl. No. 12/910,427, filed Oct. 11, 2013, 12 pages.
Office Action received for U.S. Appl. No. 12/910,427, mailed on Nov. 25, 2013, 16 pages.
Response to Office Action received for U.S. Appl. No. 12/910,427, filed Jan. 15, 2014, 12 pages.
Notice of Allowance received for U.S. Appl. No. 12/910,427, mailed on Jan. 31, 2014, 5 pages.
Notice of Allowability received for U.S. Appl. No. 12/910,427, mailed on May 13, 2014, 2 pages.
Office Action and Search Report for Chinese Patent Application No. 201180050552.8, dated Dec. 16, 2014 (7 pages), and 7 pages Of partial English Translation and Summary thereof.

REDUCING THE MAXIMUM LATENCY OF RESERVED STREAMS

CROSS-REFERENCE TO RELATED APPLICATIONS

This application is a continuation of prior co-pending U.S. patent application Ser. No. 12/910,427, filed Oct. 22, 2010, which prior application is hereby incorporated herein by reference in its entirety and for all purposes.

FIELD

This disclosure relates to reducing the maximum latency of reserved streams, such as, for example, by bandwidth reservation that may result in reduced latency.

BACKGROUND

One conventional network arrangement, e.g., an Ethernet network, permits a certain percentage (e.g., 75 percent) of network bandwidth to be set aside for reservation to one or more communication streams. In this arrangement, the transmissions of frames in the streams that have such reservations may be timed in such a way as to evenly distribute their transmissions within an observation interval, subject to other communication that may interfere with the communication streams, and based upon the total amount of bandwidth that is actually reserved. For example, according to this arrangement, if the total available bandwidth is 1 gigabit per second and the certain percentage is 75 percent, 750 megabits per second are available for possible reservation, and the total bandwidth that is actually reserved is 100 megabits per second, then the arrangement will allocate 10 percent of the total frame transmission time to transmission of frames belonging to streams that have reservations, and the transmissions of such frames will be evenly distributed (subject to the rules of the transmission medium and pending completion of transmission of already-in-flight or higher priority frames) within the allocated 10 percent of the total frame transmission time and the interval over which the bandwidth reservation is specified (e.g., the observation interval). Consequently, in this example, 90 percent of the total frame transmission time will be allocated to transmission of frames belonging to streams that do not have reservations, or more than 90 percent if the reserved streams consume less bandwidth than were reserved for them, or to idle time. As can be appreciated, although this arrangement may be capable of placing a definable upper bound on the latency experienced by frames belonging to streams that have reservations, depending upon the particular bandwidth reservations, it may also increase the average and/or maximum latency experienced by such frames, especially as frames of reserved streams arrive at the egress port from multiple queues into which they are added asynchronously, and/or as frames accumulate transmission jitter due to their traversal of multiple network hops (sometimes referred to as multiple hops of fan-in in the presence of interfering frames).

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
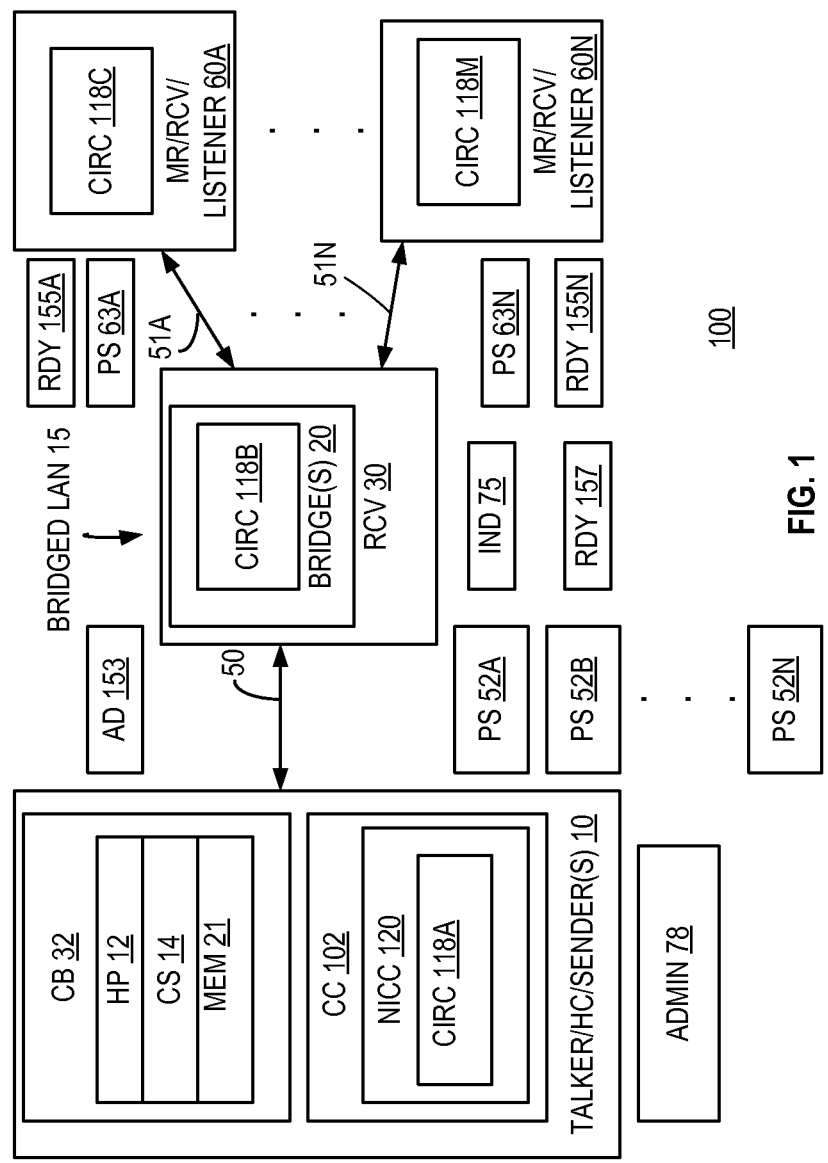
FIG. 1 illustrates a system embodiment.

FIG. 1 illustrates a system embodiment 100. System 100 may include one or more host computers (HC) 10 that may be communicatively coupled to one or more receivers (RCV) 30 via one or more wireless and/or wired network communication links 50. One or more receivers 30 may be communicatively coupled to one or more (and in this embodiment, a plurality of) other receivers 60A ... 60N via one or more (and in this embodiment, a plurality of) wireless and/or wired network communication links 51A ... 51N. In this embodiment, one or more HC 10 may be or comprise one or more senders of one or more (and in this embodiment, a plurality of) packet streams (PS) 52A ... 52N, and one or more receivers 30 and/or 60A ... 60N may be or comprise one or more intended receivers of one or more of these streams. Also in this embodiment, one or more HC 10 may be or comprise one or more "talkers," and one or more receivers 60A ... 60N may be or comprise one or more media renderer (MR) "listeners," in accordance with, for example, Amendment 12: Forwarding and Queuing Enhancements for Time-Sensitive Streams, Institute of Electrical and Electronics Engineers, Inc. (IEEE) Std. 802.1Qav-2009, approved 9 Dec. 2009 (hereinafter, "Time-Sensitive Steam Protocol" or "TSSP"). One or more receivers 30 may be or comprise one or more bridges 20 that together with MR 60A ... 60N may be comprised in bridged local area network (LAN) 15. System 100 may also comprise administrator 78. Although not shown in the Figures, it should be understood that administrator 78 may be communicatively coupled to one or more receivers 30, HC 10, and/or MR 60A ... 60N.

In this embodiment, one or more HC 10, receivers 30, and/or MR 60A ... 60N may be geographically remote from each other. In an embodiment, the terms "host computer," "host," "server," "client," "network node," "end station," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof. Also in this embodiment, a "sender" may be capable, at least in part, of transmitting, at least in part, one or more packets to one or more "receivers," and a "receiver" may be capable, at least in part, of receiving, at least in part, the one or more packets. In this embodiment, a "bridge" and "switch" may be used interchangeably, and may comprise an intermediate station that is capable, at least in part, of receiving, at least in part, one or more packets from one or more senders, and transmitting, at least in part, the one or more packets to one or more receivers. In this embodiment, a "media renderer" may comprise one or more host computers capable, at least in part, of (1) processing, at least in part, data that may be associated, at least in part, with, (2) encoding, at least in part, audio, video, graphic, display, tactile, image, and/or other and/or additional types of information, and/or (3) decoding, at least in part, such information, where such information may be intended to be, amenable to, and/or capable of, at least in part, human sensory perception, audio and/or video playback and/or recording, and/or other physical measurement and/or stimulus.

In this embodiment, a "network" may be or comprise any mechanism, instrumentality, modality, and/or portion thereof that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

One or more HC 10 may comprise circuit board (CB) 32 and circuit card (CC) 102. In this embodiment, CB 32 may comprise, for example, a system motherboard that may be physically and communicatively coupled to CC 102 via a not shown bus connector/slot system. CB 32 may comprise one or more single and/or multi-core host processors (HP) 12 and computer-readable/writable memory 21. CB 32 also may comprise one or more chipsets (CB) 14 which may comprise, e.g., memory, input/output controller circuitry, and/or network interface controller circuitry (NICC). One or more host processors 12 may be communicatively coupled via the one or more chipsets 14 to memory 21 and CC 102. CC 102 may comprise NICC 120. NICC 120 may comprise operative circuitry 118A.

Alternatively or additionally, although not shown in the Figures, some or all of circuitry 118A and/or the functionality and components thereof may be comprised in, for example, CB 32 (e.g., in one or more host processors 12 and/or the one or more chipsets 14). Also alternatively, one or more host processors 12, memory 21, the one or more not shown chipsets 14, and/or some or all of the functionality and/or components thereof may be comprised in, for example, circuitry 118A and/or CC 102. Many other alternatives are possible without departing from this embodiment.

One or more bridges 20, receivers 30, and/or MR 60A . . . 60N each may comprise respective operative circuitry 118B, 118C . . . 118M and/or other components that may be identical or substantially similar, at least in part, in their respective constructions, operations, and/or capabilities to the respective construction, operation, and/or capabilities of circuitry 118A and/or other components of one or more HC 10. Of course, alternatively, without departing from this embodiment, the respective constructions, operations, and/or capabilities of circuitry 118B . . . 118M and/or other components of one or more bridges 20, receivers 30, and/or MR 60A . . . 60N may differ, at least in part, from the respective construction, operation, and/or capabilities of circuitry 118A and/or other components of one or more HC 10.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, two or more of the following: one or more host processors, storage, mass storage, one or more nodes, and/or memory. Although not shown in the Figures, one or more hosts 10 may comprise a graphical user interface system. The not shown graphical user interface system may comprise, e.g., a respective keyboard, pointing device, and display system that may permit a human user to input commands to, and monitor the operation of, one or more hosts 10, receivers 30, bridges 20, MR 60A . . . 60N, and/or system 100.

Memory 21 may comprise one or more of the following types of memories: semiconductor firmware memory, programmable memory, non-volatile memory, read only memory, electrically programmable memory, random access memory, flash memory, magnetic disk memory, optical disk memory, one or more random access memory cells (e.g., embedded in one or more integrated circuit chips that may implement at least in part controller and/or switch functionality), and/or other or later-developed computer-readable and/or writable memory. One or more machine-readable program instructions may be stored in memory 21 and/or circuitry 118A. In operation of node 10, these instructions may be accessed and executed by one or more host processors 12 and/or circuitry 118A. When executed by one or more host processors 12 and/or circuitry 118A, these one or more instructions may result in one or more host processors 12, circuitry 118A, and/or one or more components thereof, performing operations described herein as being performed by these components of system 100.

In an embodiment, a portion, subset, or fragment of an entity may comprise all of, more than, or less than the entity. Also in an embodiment, a packet or frame may comprise one or more symbols and/or values. Additionally, in an embodiment, a value may be "predetermined" if the value, at least in part, and/or one or more algorithms, operations, and/or processes involved, at least in part, in generating and/or producing the value is predetermined, at least in part. In an embodiment, a switch may be or comprise an entity capable of receiving a frame and/or frame fragment via one or more ports of the switch, and forwarding at least a portion of the frame and/or frame fragment via one or more other ports of the switch toward a destination of the frame or frame fragment.

Circuitry 118A may exchange data and/or commands with circuitry 118B via one or more links 50, and/or circuitry 118B may exchange data and/or commands with circuitry 118C . . . 118M via one or more links 51A . . . 51N, in accordance with one or more communication protocols. For example, in this embodiment, these one or more protocols may be compatible with, at least in part, e.g., one or more Ethernet, Transmission Control Protocol/Internet Protocol (TCP/IP), User Datagram Protocol/Internet Protocol (UDP/IP), Multimedia Over Coax (MoCA), and/or International Telecommunications Union Telecommunication Standardization Sector (ITU-T) G.hn or other protocols.

For example, one or more Ethernet protocols that may be utilized in system 100 may comply or be compatible with, at least in part, IEEE Std. 802.3-2008, Dec. 26, 2008; IEEE Std. 802.1Q-2005, May 19, 2006; IEEE Std. 802.11a-1999, Feb. 11, 1999; IEEE Std. 802.11b-1999, Feb. 11, 1999; IEEE 802.11g-2003, Oct. 20, 2003; IEEE 802.11n-2009, Oct. 29, 2009; and/or, IEEE P802.1Qat/D6.0, Draft Standard for Local and Metropolitan Area Networks—Virtual Bridged Local Area Networks—Amendment 9: Stream Reservation Protocol (SRP), Apr. 23, 2010 (hereinafter "SRP"). The TCP/

IP protocol that may be utilized in system 100 may comply or be compatible with, at least in part, the protocols described in Internet Engineering Task Force (IETF) Request For Comments (RFC) 791 and 793, published September 1981. The UDP/IP protocol that may be utilized in system 100 may comply or be compatible with, at least in part, the protocols described in IETF RFC 768, published August 1980, and RFC 793, published September 1981. The MoCA protocol that may be utilized in system 100 may comply or be compatible with, at least in part, the protocol described in MoCA Specification 2.0, Jun. 19, 2010, by MoCA Alliance. The ITU-T G.hn protocol that may be utilized in system 100 may comply or be compatible with, at least in part, the protocol described in ITU-T Recommendation G.9960, approved Oct. 9, 2009. Many different, additional, and/or other protocols (including, for example, those stated above) may be used for such data and/or command exchange without departing from this embodiment (e.g., earlier and/or later-developed versions of the aforesaid, related, and/or other protocols).

After, for example, a reset or other event of or in one or more HC 10, system 100, and/or communication via one or more links 50, etc., circuitry 118A may advertise, at least in part, via, for example, one or more advertisements (AD) 153 the availability of one or more packet streams 52A . . . 52N to be transmitted, generated, and/or issued, at least in part, by circuitry 118A. For example, in this embodiment, one or more advertisements 153 may be transmitted, at least in part, via one or more links 50 to one or more receivers 30, and thence, may be transmitted, at least in part, from one or more bridges 20 to MR 60A . . . 60N via links 51A . . . 51N.

In response, at least in part, to one or more advertisements 153, circuitry 118B . . . 118M may issue, at least in part, one or more listener ready (RDY) messages 157 and/or 155A . . . 155N to one or more HC 10. One or more messages 157 and/or 155A . . . 155N may indicate, at least in part, that one or more receivers 30 and/or 60A . . . 60N are ready to receive, at least in part, one or more streams 52A . . . 52N.

In this embodiment, a packet stream, communication stream, or communication may be used interchangeably, and may be or comprise a plurality of packets, such as, for example, without limitation, a plurality of packets that may be related and/or associated with each other, at least in part (e.g., one or more media streams). Also in this embodiment, one or more advertisements 153 and/or messages 157 and/or 155A . . . 155N may comply and/or be compatible with, at least in part, TSSP.

In response, at least in part, to receipt, at least in part, of one or more messages 157 and/or 155A . . . 155N, circuitry 118A may commence, at least in part, generation and/or issuance, at least in part, of one or more streams 52A . . . 52N via one or more links 50. For example, in this embodiment, one or more streams 52A may be intended to be multicasted, at least in part, by one or more bridges 20 and/or circuitry 118B, as multicast streams 63A . . . 63N, via links 51A . . . 51N to MR 60A . . . 60N. Accordingly, as circuitry 118B receives, at least in part, one or more streams 52A, circuitry 118B may multicast, at least in part, the one or more streams 52A to MR 60A . . . 60N, as streams 63A . . . 63N, via links 51A . . . 51N.

However, prior to circuitry 118A transmitting and/or issuing, at least in part, one or more streams 52A . . . 52N via one or more links 50, circuitry 118A and/or circuitry 118B may facilitate, at least in part, one or more assignments, at least in part, of one or more bandwidth reservations to one or more of the streams 52A . . . 52N. For example, in this embodiment, circuitry 118A and circuitry 118B may negotiate, at least in part, one or more assignments, at least in part, of bandwidth reservations BWR 1 . . . BWR N to at least one subset of the one or more streams 52A . . . 52N (see FIG. 2). In this embodiment, a bandwidth reservation may comprise, at least in part, one or allocations of bandwidth. Also in this embodiment, bandwidth may comprise an amount of data that is and/or is to be propagated, processed, transmitted, and/or received, least in part, per unit time and/or link time associated with such propagation, processing, transmission, and/or reception, at least in part. Additionally, in this embodiment, an assignment of a bandwidth reservation to or for a packet stream may comprise allocation to, use by, and/or association with, at least in part, the packet stream of the bandwidth reserved by and/or in the bandwidth reservation.

For example, as a result, at least in part, of this negotiation between circuitry 118A in one or more senders 10 and circuitry 118B in one or more receivers 30, assignments, at least in part, of one or more bandwidth reservations BWR 1 and/or BWR N may be made by circuitry 118A and/or circuitry 118B to one or more streams 52A and/or 52N, respectively, prior to commencement of communication, transmission, and/or issuance of one or more streams 52A and/or 52N by circuitry 118A via one or more links 50. In this embodiment, one or more BWR 1 and/or one or more BWR N may be greater than expected communication bandwidths ECB 1 and/or ECB N of streams 52A and/or 52N, respectively. In this embodiment, an expected communication bandwidth may be the bandwidth that would be expected to be actually consumed in, by, and/or to carry out a given communication.

Figure 2:
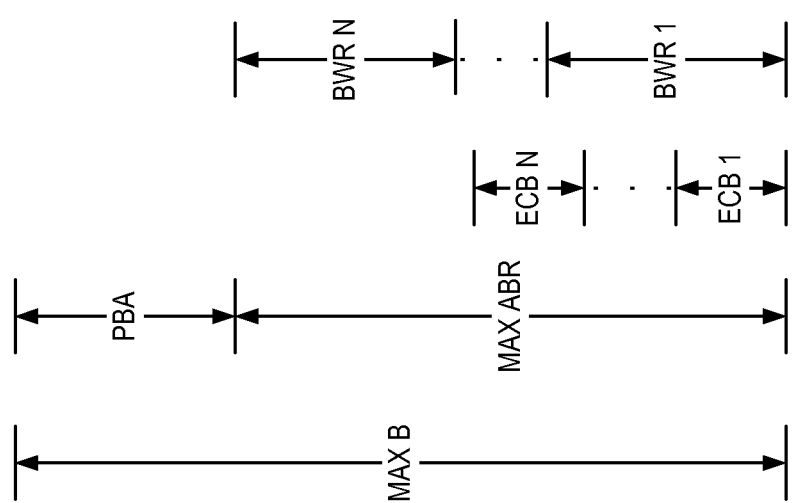
FIG. 2 illustrates features in an embodiment.

For example, in this embodiment, the maximum possible bandwidth of and/or associated with, at least in part, one or more communication links 50 may be equal to MAX B (see FIG. 2). In accordance with SRP, the maximum available bandwidth reservable (MAX ABR) may be equal to 75 percent of MAX B, and the remaining 25 percent (PBA) of MAX B may be pre-assigned to any communication streams and/or other (e.g., non-stream) communications for which no bandwidth reservations are to be negotiated and/or assigned. For example, if no bandwidth reservation is to be assigned and/or negotiated for one or more streams 52B, then the one or more previous bandwidth allocations (e.g., in accordance with SRP) represented by PBA may be assigned, at least in part, to one or more streams 52B.

In this embodiment, one or more bandwidth reservations BWR 1 may be greater than the expected communication bandwidth ECB 1 of one or more streams 52A, and may be equal to the maximum possible bandwidth MAX B of one or more links 50 less (e.g., reduced by) both one or more previous bandwidth allocations PBA and any previous and/or other bandwidth reservations (e.g., BWR N), or stated in mathematical terms, MAX B−PBA−BWR N. Thus, for example, if no previous and/or other bandwidth reservations BWR N exist and/or will be assigned and/or negotiated, then the one or more bandwidth reservations BWR 1 may be equal to MAX B minus PBA.

Negotiation of one or more bandwidth reservations BWR 1 . . . BWR N may comprise, for example, circuitry 118A specifying and/or requesting, at least in part, the one or more bandwidth reservations BWR 1 . . . BWR N and/or one or more bandwidth amounts to be reserved. Alternatively or additionally, assignment of the one or more bandwidth reservations BWR 1 . . . BWR N may be based, at least in part, upon an aggregate actual amount of bandwidth of all respective streams to be given respective bandwidth reservation assignments. For example, this aggregate actual amount of bandwidth may be pre-assigned and/or pre-determined (e.g., a priori before any such assignment is made) by administrator 78. In this embodiment, an administrator may be or comprise, for example, one or more hosts capable of performing one or more administrative, control, and/or monitoring functions, operations, and/or capabilities. Administrator 78 may provide, at least in part, an indication 75 of this aggregate actual amount to at least one intended receiver (e.g., one or more receivers 30, bridges 20, and/or circuitry 118B) of the one or more streams 52A . . . 52N, which may then use this information to appropriately negotiate and/or assign, at least in part, the one or more reservations BWR 1 . . . BWR N.

Circuitry 118A . . . 118M may negotiate and/or assign, at least in part, one or more respective bandwidth reservations on a network hop-by-hop basis. For example, circuitry 118A and circuitry 118B may negotiate and/or assign, at least in part, one or more respective bandwidth reservations BWR 1 . . . BWR N to be assigned, at least in part, to one or more streams 52A . . . 52N to be communicated, at least in part, via the respective network hop between one or more senders 10 and one or more receivers 30. Also, for example, circuitry 118B and circuitry 118C may negotiate and/or assign, at least in part, one or more respective bandwidth reservations to be assigned, at least in part, to one or more streams 63A to be communicated, at least in part, via the respective network hop between one or more receivers 30 and one or more MR 60A. Additionally, circuitry 118B and circuitry 118M may negotiate and/or assign, at least in part, one or more respective bandwidth reservations to be assigned, at least in part, to one or more streams 63N to be communicated, at least in part, via the respective network hop between one or more receivers 30 and one or more MR 60N. Circuitry 118B and 118C . . . 118N may negotiate and/or assign, at least in part, their respective bandwidth reservations in accordance with, at least in part, the operations, principles, and/or techniques described herein as being employed by circuitry 118A and 118B in the negotiation and/or assignment of one or more bandwidth reservations BWR 1 . . . BWR N.

These respective bandwidth reservations may be assigned exclusively to the respective packet streams with which they may be associated, at least in part. For example, one or more bandwidth reservations BWR 1 may assigned exclusively to and/or for use by the one or more packet streams 52A with which one or more reservations BWR 1 may be associated, at least in part.

In this embodiment, each of one or more bandwidth reservations (e.g., BWR 1) may comprise, for example, a respective plurality of bandwidth reservations, and packet traffic may only actually flow through one or more links 50 in association with a subset of the bandwidth reservations. For example, in negotiating and/or assigning, at least in part, the plurality of reservations, the unused subset of bandwidth reservations may be reserved for, by, and/or on behalf of one or more processes (not shown) that do not actually communicate packets via the unused subset. This may permit the bandwidth associated with the unused subset of the bandwidth reservations to be used to communicate the packet traffic, even though no packet traffic is actually flowing in association with the unused subset of bandwidth reservations.

Additionally or alternatively, in this embodiment, the one or more bandwidth reservations (e.g., BWR 1) may be assigned to and/or for use in connection with one or more stream reservation classes (e.g., one or more stream reservation classes associated, at least in part, with and/or corresponding, at least in part, to one or more streams 52A). In this embodiment, a stream reservation class may indicate, specify, and/or imply, at least in part, one or more desired quality of service, maximum desired latency, and/or other traffic characteristics of one or more streams associated, at least in part, with the stream reservation class.

Thus, an embodiment may include circuitry that may facilitate, at least in part, assignment, at least in part, of at least one bandwidth reservation for at least one packet stream and/or at least one stream reservation class. The at least one bandwidth reservation (e.g., for and/or in one or more devices) may be greater than an expected communication bandwidth of the at least one packet stream or stream reservation class. The assignment of the at least one bandwidth reservation may be made prior to commencement of communication of the at least one packet stream. The at least one bandwidth reservation may be assigned (e.g., exclusively) to the at least one packet stream and/or the at least one stream reservation class.

Thus, for example, in this embodiment, the one or more bandwidth reservations BWR 1 that may be assigned to one or more packet streams 52A may be greater than the expected communication bandwidth ECB 1 of one or more packet streams 52A. This may result in allocation to one or more streams 52A of a fraction of the total amount of packet transmission time that is greater than the fraction of the total amount of packet transmission time that would have been allocated to one or more streams 52A if one or more streams 52A had been assigned a bandwidth reservation equal to the expected communication bandwidth ECB 1. Advantageously, this may result in decreased maximum latency of such packets compared to the maximum latency that may result if one or more streams 52A are assigned a bandwidth reservation equal to the expected communication bandwidth ECB 1.

Many variations, modifications, and alternatives are possible without departing from this embodiment. For example, without departing from this embodiment, one or more bandwidth reservation assignments (e.g., to one or more processes that actually communicate packet stream traffic and/or to other processes that do not actually communicate such traffic) in accordance with the above techniques may be made, at least in part, on an entire communication path basis (e.g., from a sender to a listener). Alternatively or additionally, one or more such assignments may be made, at least in part, by one or more intermediate (e.g., bridge) devices, with or without intervention and/or involvement of, for example, one or more not shown management processes/applications residing at least in part in administrator 78.

Also, for example, without departing from this embodiment, one or more bridges 20 may maintain one or more tables (not shown) that may contain one or more parameters. These one or more parameters may register each stream transmitted via one or more bridges, and/or each talker and/or listener reservation associated with one or more respective bridge ports and/or in system 100. Entries in the one or more tables may be added and/or removed dynamically as, for example, each such stream, talker, and/or listener is registered or deregistered.

Many other and/or additional modifications are possible. Accordingly, this embodiment should be viewed broadly as encompassing all such alternatives, modifications, and alternatives.

What is claimed is:

1. An apparatus comprising:
   circuitry to facilitate, at least in part, assignment, at least in part, of at least one bandwidth reservation for at least one of at least one packet stream and at least one stream reservation class, the at least one bandwidth reservation being greater than an expected communication bandwidth of the at least one packet stream, the assignment of the at least one bandwidth reservation to be made prior to commencement of communication of the at least one packet stream, the at least one bandwidth reservation to be assigned to the at least one of the at least one packet stream and the at least one stream reservation class, the at least one bandwidth reservation being made, at least in part, with involvement of at least one process residing, at least in part, in a network administrator;

wherein:
the at least one bandwidth reservation includes a bandwidth reservation subset that is reserved by one or more processes; and
the bandwidth reservation subset is to be unused by the one or more processes for packet communication.

2. The apparatus of claim 1, wherein:
the at least one bandwidth reservation is made for an entire communication path from at least one sender to at least one listener.

3. The apparatus of claim 1, wherein:
the at least one bandwidth reservation is made, at least in part, by one or more intermediate devices.

4. The apparatus of claim 1, wherein:
the at least one bandwidth reservation includes a plurality of bandwidth reservations; and
the bandwidth reservation subset that also is reserved on behalf of the one or more processes.

5. The apparatus of claim 1, wherein:
the at least one packet stream is to be multicasted from at least one sender to intended receivers;
the circuitry is to facilitate, at least in part, respective bandwidth reservation assignments associated, at least in part, with respective hops from the at least one sender to the intended receivers;
the at least one sender is to advertise availability of the at least one stream;
the intended receivers are to indicate readiness to receive the at least one stream; and
the circuitry is to be comprised, at least in part, in a bridge.

6. Computer-readable memory storing one or more instructions that when executed by a machine result in performance of operations comprising:
facilitating, at least in part, by circuitry, assignment, at least in part, of at least one bandwidth reservation for at least one of at least one packet stream and at least one stream reservation class, the at least one bandwidth reservation being greater than an expected communication bandwidth of the at least one packet stream, the assignment of the at least one bandwidth reservation to be made prior to commencement of communication of the at least one packet stream, the at least one bandwidth reservation to be assigned to the at least one of the at least one packet stream and the at least one stream reservation class, the at least one bandwidth reservation being made, at least in part, with involvement of at least one process residing, at least in part, in a network administrator;
wherein:
the at least one bandwidth reservation includes a bandwidth reservation subset that is reserved by one or more processes; and
the bandwidth reservation subset is to be unused by the one or more processes for packet communication.

7. The memory of claim 6, wherein:
the at least one bandwidth reservation is made for an entire communication path from at least one sender to at least one listener.

8. The memory of claim 6, wherein:
the at least one bandwidth reservation is made, at least in part, by one or more intermediate devices.

9. The memory of claim 6, wherein:
the at least one bandwidth reservation includes a plurality of bandwidth reservations; and
the bandwidth reservation subset also is reserved on behalf of the one or more processes.

10. The memory of claim 6, wherein:
the at least one packet stream is to be multicasted from at least one sender to intended receivers;
the circuitry is to facilitate, at least in part, respective bandwidth reservation assignments associated, at least in part, with respective hops from the at least one sender to the intended receivers;
the at least one sender is to advertise availability of the at least one stream;
the intended receivers are to indicate readiness to receive the at least one stream; and
the circuitry is to be comprised, at least in part, in a bridge.

11. A method comprising:
facilitating, at least in part, by circuitry, assignment, at least in part, of at least one bandwidth reservation for at least one of at least one packet stream and at least one stream reservation class, the at least one bandwidth reservation being greater than an expected communication bandwidth of the at least one packet stream, the assignment of the at least one bandwidth reservation to be made prior to commencement of communication of the at least one packet stream, the at least one bandwidth reservation to be assigned to the at least one of the at least one packet stream and the at least one stream reservation class, the at least one bandwidth reservation being made, at least in part, with involvement of at least one process residing, at least in part, in a network administrator;
wherein:
the at least one bandwidth reservation includes a bandwidth reservation subset that is reserved by one or more processes; and
the bandwidth reservation subset is to be unused by the one or more processes for packet communication.

12. The method of claim 11, wherein:
the at least one bandwidth reservation is made for an entire communication path from at least one sender to at least one listener.

13. The method of claim 11, wherein:
the at least one bandwidth reservation is made, at least in part, by one or more intermediate devices.

14. The method of claim 11, wherein:
the at least one bandwidth reservation includes a plurality of bandwidth reservations; and
the bandwidth reservation subset also is reserved on behalf of the one or more processes.

15. The method of claim 11, wherein:
the at least one packet stream is to be multicasted from at least one sender to intended receivers;
the circuitry is to facilitate, at least in part, respective bandwidth reservation assignments associated, at least in part, with respective hops from the at least one sender to the intended receivers;
the at least one sender is to advertise availability of the at least one stream;
the intended receivers are to indicate readiness to receive the at least one stream; and
the circuitry is to be comprised, at least in part, in a bridge.

* * * * *

UNITED STATES PATENT AND TRADEMARK OFFICE
CERTIFICATE OF CORRECTION

| | |
|---|---|
| PATENT NO. | : 9,014,211 B2 |
| APPLICATION NO. | : 14/254540 |
| DATED | : April 21, 2015 |
| INVENTOR(S) | : Kevin B. Stanton |

It is certified that error appears in the above-identified patent and that said Letters Patent is hereby corrected as shown below:

In the Claims

In column 9, line 24, in line 4 of claim 4, delete "that".

Signed and Sealed this
Eighteenth Day of August, 2015

Michelle K. Lee
*Director of the United States Patent and Trademark Office*